United States Patent [19]

Schnabel

[11] 4,436,626

[45] Mar. 13, 1984

[54] CAPILLARY DIAPHRAGMS FOR USE IN DIAFILTRATION

[75] Inventor: Roland Schnabel, Hofheim, Fed. Rep. of Germany

[73] Assignee: JENAer Glaswerk Schott & Gen., Fed. Rep. of Germany

[21] Appl. No.: 378,187

[22] Filed: May 14, 1982

Related U.S. Application Data

[63] Continuation of Ser. No. 970,795, Dec. 18, 1978, abandoned.

[30] Foreign Application Priority Data

Dec. 23, 1977 [DE] Fed. Rep. of Germany ....... 2757673

[51] Int. Cl.$^3$ ............................................. B01D 13/00
[52] U.S. Cl. ................................ 210/652; 210/321.1; 210/927
[58] Field of Search ................... 65/2, 31; 55/16, 158; 252/431 R; 210/321.1, 321.2, 321.3, 321.5, 652, 210/DIG. 24, 927; 604/4, 7

[56] References Cited

U.S. PATENT DOCUMENTS

| | | | |
|---|---|---|---|
| 3,278,476 | 10/1966 | Santelli | 526/279 |
| 3,498,909 | 3/1970 | Littman | 210/652 |
| 3,579,441 | 5/1971 | Brown | 210/258 |
| 3,583,907 | 6/1971 | Brosanyi | 210/321.1 |
| 3,799,873 | 3/1974 | Brown | 210/321.3 |
| 3,825,493 | 7/1974 | Brown et al. | 210/321.1 |
| 3,956,179 | 5/1976 | Sebestian et al. | 252/431 R |
| 4,032,359 | 8/1977 | Schnabel et al. | 65/2 |
| 4,038,190 | 7/1977 | Baudet et al. | 210/321.1 |
| 4,071,316 | 1/1978 | Wright | 210/927 |

FOREIGN PATENT DOCUMENTS

728626 11/1942 Fed. Rep. of Germany ... 210/321.1
2041496 3/1977 Japan .

OTHER PUBLICATIONS

A. Messing, "Molecular Inclusions, Adsorption of Macromolecules on Porous Glass Membranes", American Chemical Soc., 91, 2370, 1969, pp. 93 and 94.
"Blood Clotting Forestalled by Special Glass Surface Treatment", American Glass Review, Dec. 1969, p. 25.
R. A. Messing, "Glasses as Bioactive Materials", paper presented at the 11th International Conference on Glass, Prague 1977, pp. 482–491.

Primary Examiner—Charles N. Hart
Assistant Examiner—Wanda L. Millard
Attorney, Agent, or Firm—Hill, Van Santen, Steadman & Simpson

[57] ABSTRACT

A device for diafiltration comprising a housing having an inlet, first and second outlets, a diaphragm disposed in the housing and means for sealing the diaphragm in the housing so that the material entering the inlet and not passing through the diaphragm is removed by the first outlet while the material passing through the diaphragm is removed from the housing through the second outlet characterized by the improvements of the diaphragms being formed by a plurality of capillary diaphragms arranged with the housing to require the least structural volume and each of the capillary diaphragms being an inorganic material, such as porous glass, which is chemically modified in a known manner, such as being treated with molecules including radicals, such as silane derivatives, with the functional groups.

3 Claims, 2 Drawing Figures

CAPILLARY DIAPHRAGMS FOR USE IN DIAFILTRATION

This is a continuation of application Ser. No. 970,795, filed Dec. 18, 1978, now abandoned.

BACKGROUND OF THE INVENTION

The present invention is directed to a modified porous glass diaphragm in the form of capillary diaphragms for use in a device for diafiltration which device is particularly useful as an artificial kidney.

The expression "diafiltration" relates to a diaphragm or membrane process used for rapid and preventive segregation or reconcentration of low molecular substance from high molecular substances in a solution without a phase change. Such a process also enables fractionating separation. The driving force in a diafiltration device is essentially the pressure differential across the diaphragm or membrane. Because of the use of this driving force, the process of diafiltration differs from dialysis, which uses the concentration gradient as its driving force.

The advantages of diafiltration lie in better process control and in the definite separation of molecules. Hitherto, diafiltration has been mainly implemented by means of polymer membranes or diaphragms of varying plastic materials. These diaphragms have considerable disadvantages in spite of their good functional efficiency. One of the main disadvantages in the poor adaptability of the diaphragm material to certain application problems that occur in using the device. In particular, active molecules, which are especially present in biological solutions, are prone to build up by adhesion or absorption on the surface of the diaphragm and thus reduce the permeability performance of the diaphragm. Other problems reside in the non-universal resistance of the diaphragm material to organic solution reagents, in the relatively poor pressure stability, which results in structural changes at high system pressures and in the low temperature stability, which will, for instance, exclude part of the usual sterilization procedures. As a result of this poor pressure stability and poor chemical resistance, cleaning procedures by reverse flushing in which organic solvents or other inorganic acids or alkalies are used, cannot be carried out particularly in the case of asymmetrical diaphragms.

The design of the device is a decisive factor in medical applications which use a diaphragm for filtering body fluids. A flat plastic material diaphragm requires a greater volume then capillaries in relation to a given diaphragm exchange surface. The greater structural volume is usually combined with greater hollow volume or dead spaces so that more body fluid is required to ensure the diafiltration. Owing to differing flow properties at the surface of the flat diaphragm, there is a tendency of blocking the diaphragm in the slower flow areas.

SUMMARY OF THE INVENTION

The present invention is directed to providing diafiltration diaphragms which circumvent the above mentioned limiting factors of difficulty so that the scope of the applications of the technical procedures of diafiltration may be exploited to their maximum.

To accomplish these tasks, the invention is directed to an improvement in a device for diafiltration which comprises a housing having an inlet and first and second outlets, a diaphragm disposed in the housing and means for sealing the diaphragm in the housing so that a material entering through the inlet and not passing through the diaphragm leaves the housing through the first outlet and the material passing through the diaphragm exits out through the second outlet. The improvements comprise the diaphragm being formed by a plurality of capillary diaphragms, said capillary diaphragms and the housing being grouped in an arrangement of the smallest possible structural volume, and each of said capillary diaphragms being composed of an inorganic material chemically modified in a known manner.

Preferably, the capillary diaphgrams are made of a porous glass which are known, for example, as described in German Printed Application No. AS 24 54 111 and U.S. Pat. No. 4,042,359. This glass has a high pore distribution so that a pore diameter can be adjusted anywhere in a range of 30 Å to 1000 Å.

The capillary geometry must be selected in accordance with the requirements of high permeability of larger pores and more favorable performance of internal flow capillaries with the purpose of diafiltration. Each capillary diaphragm may have an external diameter in a range of 200 $\mu$m to 5000 $\mu$m and a wall thickness in a range of 10 $\mu$m to 200 $\mu$m.

The chemical modification of inorganic material of the capillary diaphragm includes treating with molecules comprising a radical selected from a group consisting of silanol, silanes and hydrosilicons in combination with a functional group selected for the purpose or intended use of the device as a diafiltrator. The functional group being selected from a group consisting of —CH$_3$, —CN, —OH, —SO$_3$H, —NH$_2$, —N$^{(+)}$R$_3$, —NO$_2$, —COOR,

—COOH, —SH, —NO, —NC and mixture thereof.

When the basic structure consists mainly of silicon dioxide, reactive silanol groups are utilized to modify and influence the specific surface with a density of approximately 5.5 OH/100 Å$^2$. The silanol groups have a marked effect particularly during the preparation of physiological solutions. The surface activity of the glass must consequently be reduced, which reduction is achieved by reaction with organic reactive molecules, mostly functional silanes. Since hydrosilicons and silanes are hydrophobic and for instance tend to inhibit the water permeability of a diaphragm, the free silanes must carry functional groups. The number of available types of molecules extends over the whole of the organic chemical range and includes, for example, hydrophobic substances, for instance silane hydrocarbons, through neutral substances, for example nitro groups, to hydrophilic substances, such as sulfonic acid groups. In addition to the functional groups, a decisive factor for a polarity is the extent of the reactivity of the organic molecules with the silanol groups.

The complete diaphragm consists of a chemically resistance base structure for forming the matrix. This chemically resistant base structure enables achievement of pressure stability, for example up to 100 bars; temperature stability, for example up to 500° C. and structural stability, for example no change in porosity when using different organic solvents or under different pH values and no swelling or contracting. In addition, this base structure enables obtaining the desired shape such as the capillary form.

The matching of the diaphragm to the application or use is achieved by chemical modification of the surface. This chemical modification will reduce the temperature stability so that the maximum temperature is 250° C., but the chemical stability will be increased and the pore distribution is even closer. By grouping the capillaries together in the cylindrical-shaped housing, it is possible to obtain an extremely high diaphragm surface value per unit of volume with the filling up of the volume of up to 90%.

DESCRIPTION OF THE PREFERRED EMBODIMENTS

Figure 1:
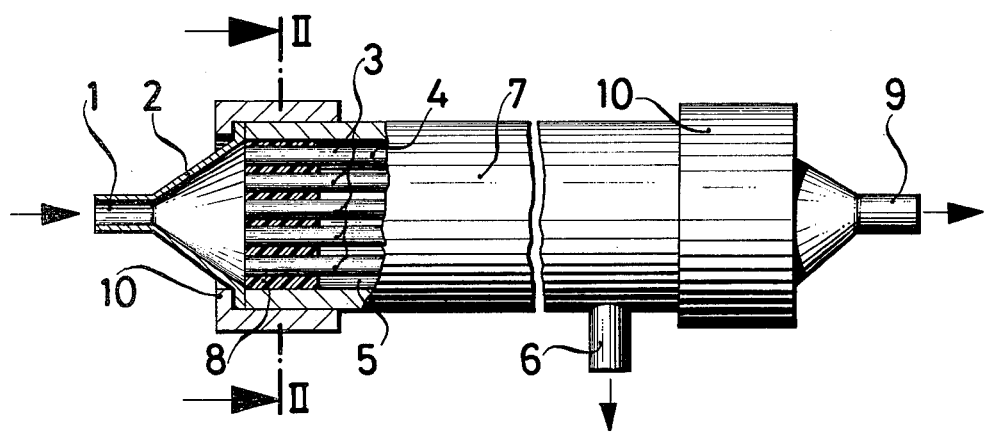
FIG. 1 is a side view with portions broken away for purposes of illustration of a device for diafiltration in accordance with the present invention.
Figure 2:
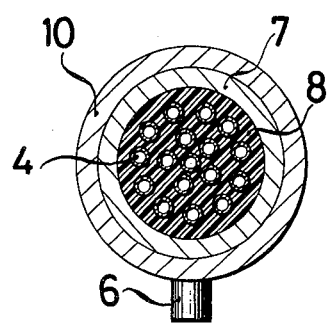
FIG. 2 is a cross section taken along lines II—II of FIG. 1.

The principles of the present invention are particularly useful in a filter device illustrated in FIGS. 1 and 2 which has a modular housing 7 which is a cylindrical member. The member or housing 7 is provided at one end with the distribution channel or member 2 which has an inlet 1 for receiving a flow of a solution or material as indicated by the arrow. At the other end, the housing 7 has a distribution channel or member similar to member 2 having a first outlet 9. Midway between the inlet and outlet, the housing 7 has one or more second outlets 6. Arranged within the cylindrical housing 7 is a capillary pack 3 which includes individual capillary diaphragms 4. The capillary pack 3 is sealed within the housing 7 by casting compounds 8 adjacent each end so that the pack is sealed within the housing. To hold each of the distribution members such as 2 on the housing, suitable caps 10 are provided.

The sealing means, which is formed by the compound 8, ensures that a starting solution entering the inlet 1 as indicated by the arrow which solution does not pass through the walls of the capillary diaphragms 4 will be discharged through the first outlet 9. However, the portion of the starting solution, which permeates the walls of the capillaries 4, will be discharged through the second discharge or second outlet 6.

A special application of the device for diafiltration lies in diafiltration equipment used for the purpose of removing body waste products in place of the kidneys.

The use of dialysis equipment has heretofore been a source of problems because the substance to be removed is present in differing sizes and concentrations. Contrary to dialysis machines, so-called "medium molecule materials" for which the chemical nature has not yet been established but which materials lie in a molecular weight range of 300–5000 can be reliably removed by means of the diafiltrator. Such molecules will occur particularly in the plasma of uremic patients. To prevent coagulation of the blood on an untreated glass surface, special surface modifications of the surfaces of the capillary diaphragms are provided to prevent the activation of the blood coagulation.

For an economic viewpoint of medical treatment, the reusability of the artificial kidney is a particular advantage. The surface can be cleaned, for instance, by rinsing with a solution of alcohol and hydrochloric acid or a solution of sodium decylsulphate. The module is then sterilized and may be used over again. Depending on the pressure stability of the material, this cleaning operation can also be achieved by a reflux rinsing.

The following examples are provided:

EXAMPLE 1

A module was provided which had the following characteristics:
active length: 9.4 cm,
capillary units: 50,
surface area: 80.8 cm$^2$, and a chemical modification to a final alcohol bearing OH-groups. This module was tested with preserved blood and an analysis of the ultrafiltrates showed no albumen content, however, all low and medium molecular substances were present. Hydraulic permeability was 9 ml/m$^2$hmmHg.

EXAMPLE 2

A module was provided having the following characteristics:
active length: 8.8 cm,
capillary units: 100, and
surface area: 151.2 cm$^2$.

The chemical modification of this unit resulted in a final NO$_2$ group. This module was run for a total of nine tests with a total service period of 50 hours. Between individual tests the module was cleaned with physiological table salt and stored so that the total contact time of 960 hours was recorded. The module's specific values, for example retention power and permeability, remain constant and were in the order of the retention power of the module of the above mentioned Example I although the ultrafiltration capacity was somewhat higher at 10 ml/m$^2$hmmHg. This module is a reusable hemo-filtrator unit.

Although various minor modifications may be suggested by those skilled in the art, it should be understood that I wish to embody within the scope of the patent warranted hereon, all such modifications as reasonably and properly come within the scope of my contribution to the art.

I claim:

1. A method of treating blood comprising providing a device having a housing with an inlet, a first outlet and a second outlet, a plurality of capillary diaphragms of porous glass material having means for preventing coagulation of blood, said means for preventing coagulation comprising a chemical surface modification of the glass material with molecules comprising a radical selected from a group consisting of silanol, silanes and hydrosilicons in combination with a functional group being selected from a group consisting of —CH$_3$, —CN, —OH, —SO$_3$H, —NH$_2$, —N$^{(+)}$R$_3$, —NO$_2$, —COOR,

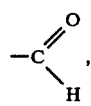

—COOH, —SH, —NO and —NC, and means for sealing the diaphragms in the housing so that a portion of the blood entering through the inlet and not passing through the diaphragms leaves the housing through the first outlet while a portion passing through the diaphragms exits the housing through the second outlet, introducing blood at the inlet and removing portions from each of the first and second outlets so that the blood is treated without any coagulation occurring.

2. A method according to claim 1, wherein said radical is silane.

3. A method according to claim 1, wherein said treating comprises removing body waste from the blood, and wherein the step of removing portions from each outlet includes removing blood from one of the first and second outlets and removing the body waste from the outer of said first and second outlets.

* * * * *